(12) United States Patent
Ettinger et al.

(10) Patent No.: US 9,648,297 B1
(45) Date of Patent: May 9, 2017

(54) SYSTEMS AND METHODS FOR ASSISTING A USER IN CAPTURING IMAGES FOR THREE-DIMENSIONAL RECONSTRUCTION

(71) Applicant: GOOGLE INC., Mountain View, CA (US)

(72) Inventors: Scott M. Ettinger, San Carlos, CA (US); Abhijit S. Ogale, Mountain View, CA (US)

(73) Assignee: Google Inc., Mountain View, CA (US)

( * ) Notice: Subject to any disclaimer, the term of this patent is extended or adjusted under 35 U.S.C. 154(b) by 709 days.

(21) Appl. No.: 13/730,402

(22) Filed: Dec. 28, 2012

(51) Int. Cl.
*H04N 13/00* (2006.01)

(52) U.S. Cl.
CPC .............................. *H04N 13/0007* (2013.01)

(58) Field of Classification Search
CPC ........................ G06K 9/00664; G06T 7/004
See application file for complete search history.

(56) References Cited

U.S. PATENT DOCUMENTS

| | | | |
|---|---|---|---|
| 6,363,169 B1 | 3/2002 | Ritter et al. | |
| 7,649,688 B2 | 1/2010 | Racette et al. | |
| 7,711,179 B2 * | 5/2010 | Knighton | G01B 11/24 382/154 |
| 2008/0247667 A1 * | 10/2008 | Jin | G06T 3/4038 382/284 |
| 2009/0316962 A1 * | 12/2009 | Sun | G06K 9/00248 382/118 |
| 2012/0162374 A1 * | 6/2012 | Markas | H04N 13/0221 348/46 |
| 2013/0135446 A1 * | 5/2013 | Lee | H04N 5/23238 348/48 |
| 2013/0215233 A1 * | 8/2013 | Wang | G06T 17/00 348/47 |
| 2014/0010407 A1 * | 1/2014 | Sinha | G06K 9/00664 382/103 |

* cited by examiner

*Primary Examiner* — William C Vaughn, Jr.
*Assistant Examiner* — Jerry Jean Baptiste
(74) *Attorney, Agent, or Firm* — Lerner, David, Littenberg, Krumholz & Mentlik, LLP (57) ABSTRACT

Systems and methods for assisting a user in capturing images for three-dimensional (3D) reconstruction are provided. A system includes an input module configured to receive current video image data from a device. The system also includes an analysis module configured to determine a 3D reconstruction indicator based on the current video image data and a previous image (or images) of a target captured by the device. The analysis module is also configured to determine whether the 3D reconstruction indicator is sufficient to allow a 3D reconstruction of the target based on the current video image data and the previous image. The system also includes a guidance module configured to assist the user in capturing a current image of the target from the current video image data based on the determination of whether the 3D reconstruction indicator is sufficient.

17 Claims, 6 Drawing Sheets

SYSTEMS AND METHODS FOR ASSISTING A USER IN CAPTURING IMAGES FOR THREE-DIMENSIONAL RECONSTRUCTION

FIELD

The subject technology generally relates to image capturing and, in particular, relates to systems and methods for assisting a user in capturing images for three-dimensional reconstruction.

BACKGROUND

A user may position a camera to capture images of an object from different viewpoints in order to generate a three-dimensional (3D) model of the object based on the captured images. However, in order for the 3D model to be generated, the images typically need to be captured from specific viewpoints rather than arbitrary viewpoints. It is therefore difficult for the user to determine from which specific viewpoints the images should be captured from in order to generate the 3D model. If the user captures more images than necessary to make sure that there are a sufficient number of images from the specific viewpoints to generate the 3D model, then many redundant and unnecessary images may be captured. On the other hand, if the user does not capture enough images from the specific viewpoints needed to generate the 3D model, then the user may not be able to generate the 3D model.

SUMMARY

According to various aspects of the subject technology, a system for assisting a user in capturing images for three-dimensional (3D) reconstruction is provided. The system includes an input module configured to receive current video image data from a device. The current video image data is associated with a current pose of the device. The system further includes an analysis module configured to determine a 3D reconstruction indicator based on the current video image data and a previous image (or images) of a target captured by the device. The previous image is associated with a previous pose of the device. The 3D reconstruction indicator includes: (i) an amount of motion of the device between the current pose and the previous pose; and/or (ii) an amount of overlap between the current video image data and the previous image. The motion of the device includes a translational motion and a rotational motion. The analysis module is further configured to determine whether the 3D reconstruction indicator is sufficient to allow a 3D reconstruction of the target based on the current video image data and the previous image. The system also includes a guidance module configured to assist the user in capturing a current image of the target from the current video image data based on the determination of whether the 3D reconstruction indicator is sufficient.

According to various aspects of the subject technology, a computer-implemented method for assisting a user in capturing images for three-dimensional (3D) reconstruction is provided. The method includes receiving current video image data from a device. The current video image data is associated with a current pose of the device. The method also includes determining a 3D reconstruction indicator based on the current video image data and a previous image (or images) of a target captured by the device. The previous image is associated with a previous pose of the device. The 3D reconstruction indicator includes: (i) an amount of motion of the device between the current pose and the previous pose; and/or (ii) an amount of overlap between the current video image data and the previous image. The motion of the device includes a translational motion and a rotational motion. The method also includes determining whether the 3D reconstruction indicator is sufficient to allow a 3D reconstruction of the target based on the current video image data and the previous image. The method also includes assisting the user in capturing a current image of the target from the current video image data based on the determination of whether the 3D reconstruction indicator is sufficient.

According to various aspects of the subject technology, a machine-readable medium encoded with executable instructions for assisting a user in capturing images for three-dimensional (3D) reconstruction is provided. The instructions include code for receiving current video image data from a device. The current video image data is associated with a current pose of the device. The instructions also include code for comparing the current video image data to a previous image (or images) of a target captured by the device. The previous image is associated with a previous pose of the device. The instructions also include code for determining a 3D reconstruction indicator based on the comparison of the current video image data to the previous image. The 3D reconstruction indicator includes: (i) an amount of motion of the device between the current pose and the previous pose; and/or (ii) an amount of overlap between the current video image data and the previous image. The motion of the device includes a translational motion and a rotational motion. The instructions also include code for determining whether the 3D reconstruction indicator is sufficient to allow a 3D reconstruction of the target based on the current video image data and the previous image. The instructions also include code for assisting the user in capturing a current image of the target from the current video image data based on the determination of whether the 3D reconstruction indicator is sufficient.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In the following detailed description, numerous specific details are set forth to provide a full understanding of the subject technology. It will be apparent, however, that the subject technology may be practiced without some of these specific details. In other instances, well-known structures and techniques have not been shown in detail so as not to obscure the subject technology.

According to various aspects of the subject technology, systems and methods for assisting a user in capturing images for 3D reconstruction are provided. A user may aim a camera device at a target (e.g., one or more objects in a scene), and while the user positions the camera device at various locations around the target, the user may be directed to capture images from specific viewpoints needed to generate a 3D model of the target. In some aspects, the images may be automatically captured. The captured set of images may provide at least a minimum number of images needed to generate the 3D model, thereby ensuring that the 3D model can be generated. However, the number of images in this set may not be so many that a large number of unnecessary and redundant images would be captured. According to certain aspects, the user may be guided to the specific positions needed to capture the images for generating the 3D model.

Figure 1:
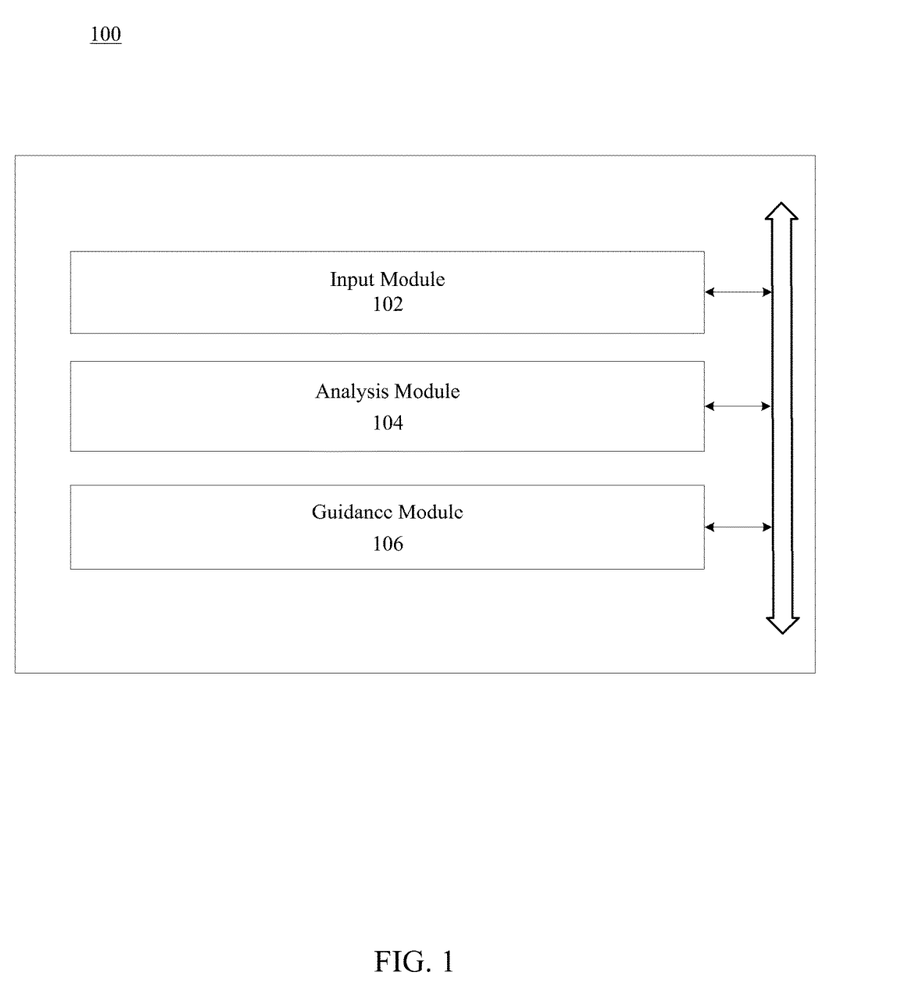
FIG. 1 illustrates an example of a system for assisting a user in capturing images for 3D reconstruction, in accordance with various aspects of the subject technology.

FIG. 1 illustrates an example of system 100 for assisting a user in capturing images for 3D reconstruction, in accordance with various aspects of the subject technology. System 100, for example, may be implemented as part of a device that is used to capture the images for 3D reconstruction. The device may include a camera, a mobile phone, a laptop computer, a netbook computer, a tablet computer, a personal digital assistant, a portable gaming system, a global positioning system, and/or other suitable electronic instrument capable of capturing images. System 100 comprises input module 102, analysis module 104, and guidance module 106. These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 2:
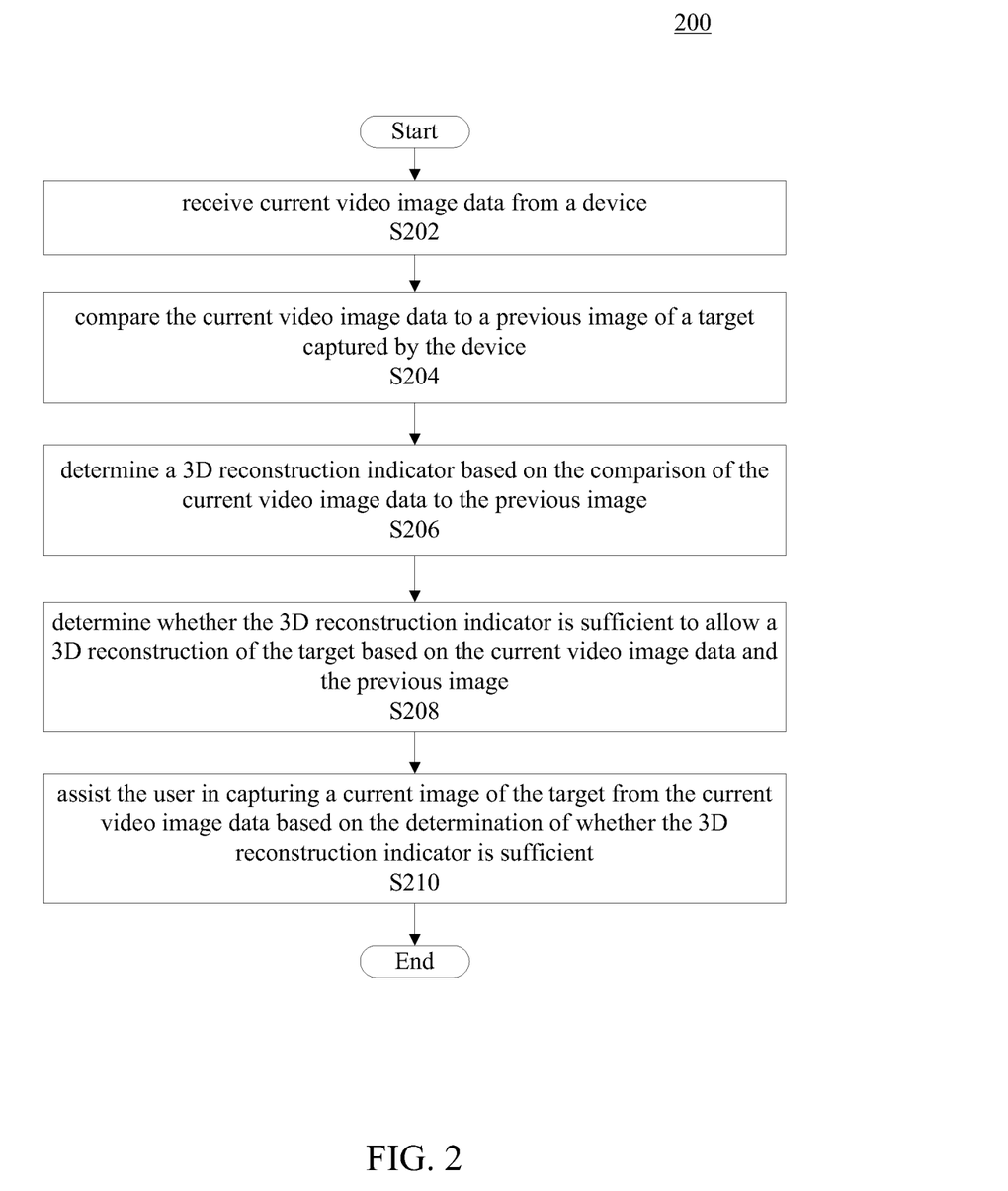
FIG. 2 illustrates an example of a method for assisting a user in capturing images for 3D reconstruction, in accordance with various aspects of the subject technology.
Figure 3:
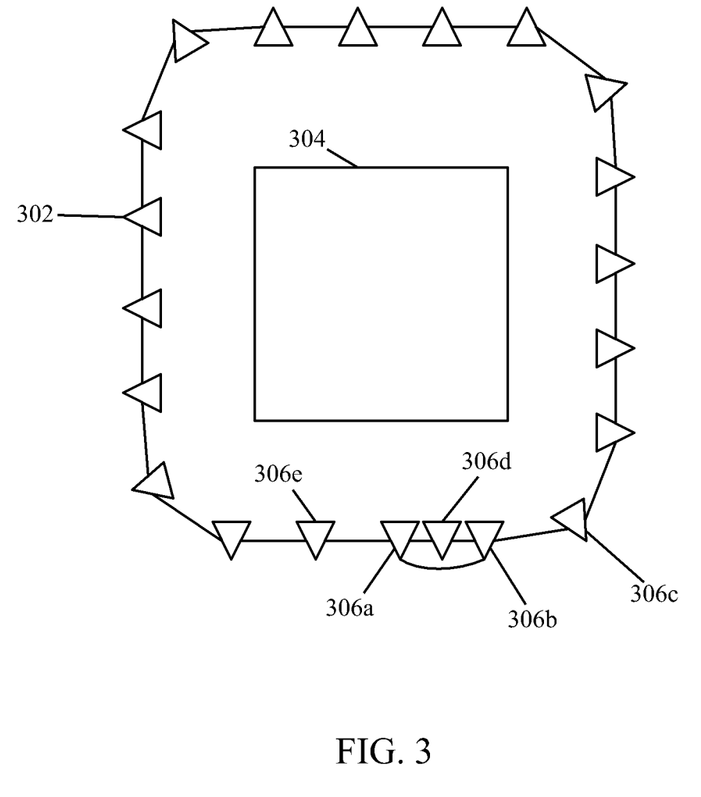
FIG. 3 illustrates, from a top view, a plurality of poses that a device may engage in to capture images of a target, in accordance with various aspects of the subject technology.
Figure 4A:
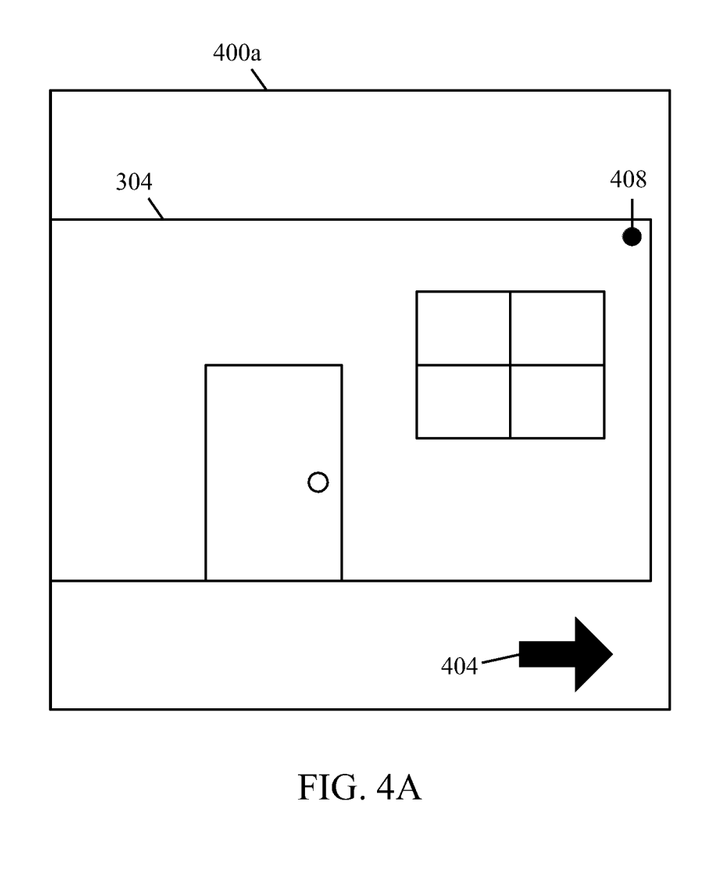
FIGS. 4A, 4B, and 4C illustrate examples of different viewpoints of a target that may be displayed on a screen of a device, in accordance with various aspects of the subject technology.
Figure 4B:
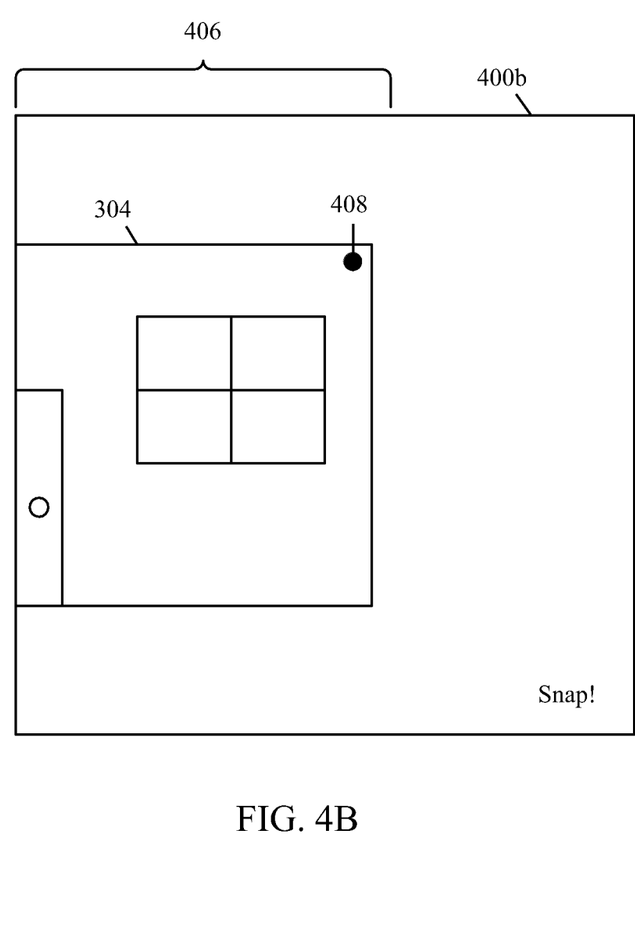
Figure 4C:
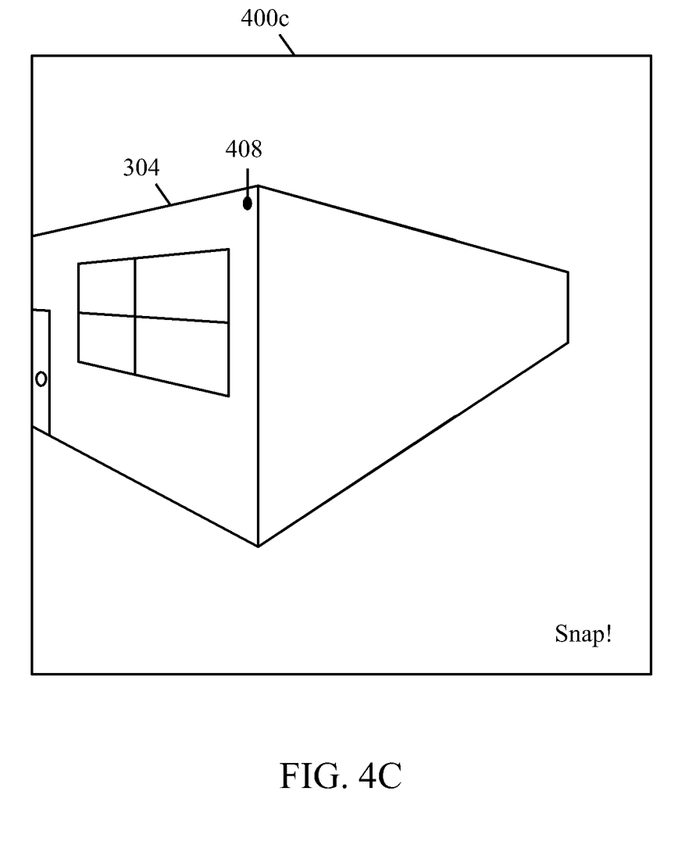

FIG. 2 illustrates an example of method 200 for assisting a user in capturing images for 3D reconstruction, in accordance with various aspects of the subject technology. System 100, for example, may be used to implement method 200. However, method 200 may also be implemented by systems having other configurations. FIG. 3 illustrates an example of a situation in which method 200 may be implemented to assist a user in using device 302 to capture images of building 304 (the desired target) for 3D reconstruction of building 304. In particular, FIG. 3 illustrates, from a top view, a plurality of poses (e.g., position and/or orientation) that device 302 may engage in to capture the images of building 304. Each pose of device 302 may provide a different viewpoint of building 304. FIGS. 4A, 4B, and 4C illustrate examples of some of the different viewpoints of building 304 that may be displayed on a screen of device 302. For example, when device 302 is engaged in pose 306a, the screen of device 302 may display viewpoint 400a in FIG. 4A. When device 302 is engaged in pose 306b, the screen of device 302 may display viewpoint 400b in FIG. 4B. When device 302 is engaged in pose 306c, the screen of device 302 may display viewpoint 400c in FIG. 4C. Although method 200 is described herein with reference to the system(s), device(s), and viewpoints of FIGS. 1, 3, 4A, 4B, and 4C, method 200 is not limited to such.

For purposes of illustration, assume that device 302 is currently engaged in pose 306b. According to step S202 of method 200, input module 102 receives current video image data from device 302 when device 302 is engaged in pose 306b. This video image data, for example, may be displayed on the screen of device 302 to allow the user to visualize what image can be currently captured. According to step S204, analysis module 104 compares the current video image data (e.g., illustrated by viewpoint 400b) to a previous image of building 304 captured by device 302. For purposes of illustration, assume that the previous image was captured by device 302 when device 302 was engaged in pose 306a. Thus, the previous image is represented by viewpoint 400a. Analysis module 104 may compare the current video image data to the previous image using point tracking. For example, analysis module 104 may determine how much point 408 in the current video image data has translated and/or rotated relative to the same point 408 in the previous image. Although the viewpoint 400a is used to illustrate an example of the previous image, it is understood that the previous image described herein can include more than one previous images (e.g., including the image captured by device 302 when device 302 was engaged in pose 306e).

According to step S206, analysis module 104 determines a 3D reconstruction indicator based on the comparison of the current video image data to the previous image. The 3D reconstruction indicator may be any suitable gauge used to determine whether a current image captured from the current video image data together with the previous image are sufficient to generate a 3D reconstruction of building 304. For example, the 3D reconstruction indicator may be at least one of (i) an amount of motion of device 302 between current pose 306b and previous pose 306a, (ii) an amount of overlap between the current video image data and the previous image, (iii) a 3D information ratio, and (iv) a number of multiview tracks of the current video image data.

If the 3D reconstruction indicator comprises the amount of overlap between the current video image data and the at least one previous image, analysis module 104 may compute this amount of overlap. The amount of overlap is illustrated in FIG. 4B, for example, as overlapping region 406. In some aspects, analysis module 104 may compute the amount of overlap based on the comparison of the current video image data to the previous image. For example, depending on how much the current video image data has translated and/or rotated relative to the previous image based on the point tracking, analysis module 104 can determine the amount of overlap between the current video image data and the previous image.

If the 3D reconstruction indicator comprises the amount of motion of device 302 between current pose 306b and previous pose 306a, analysis module 104 may compute this amount of motion. According to certain aspects, this motion can include six degrees of freedom of device 302. For example, the motion may include a translational and/or rotational motion. The amount of motion is shown in FIG. 3, for example, as a distance between device 302 at pose 306*a* and device 302 at pose 306*b*.

According to certain aspects, analysis module 104 may implicitly compute the amount of motion by computing the 3D information ratio. The 3D information ratio may be used to determine whether the current video image data (e.g., if captured as an image) provides a suitable amount of 3D information compared to two-dimensional (2D) information. For example, analysis module 104 may identify 3D feature points of the current video image data and of the previous image, and generate at least a partial intermediate 3D motion model based on these 3D feature points. This intermediate 3D motion model may be referred to as the fundamental matrix F. Analysis module 104 may also identify 2D feature points of the current video image data and of the previous image, and generate at least a partial 2D motion model based on the 2D feature points. This 2D motion model may be referred to as homography H. The 3D information ratio may be a ratio of a number of the 3D feature points (e.g., those that fit the fundamental matrix F) to a number of the 2D feature points (e.g., those points that fit the homography H). In this regard, the 3D information ratio may represent how much better the 3D feature points fit the fundamental matrix F than the 2D feature points fit the homography H. The higher the 3D information ratio, the more 3D information that is provided by the current video image data.

Although the amount of motion and the amount of overlap are described as being computed based on the comparison of the current video image data to the previous image, the amount of motion and the amount of overlap may also be computed using other techniques. In some aspects, analysis module 104 may compute the amount of motion and/or the amount of overlap based on other sensors. For example, if device 302 comprises a global positioning sensor, input module 102 may receive position information of device 302 at poses 306*a* and 306*b*. Thus, analysis module 104 may compute the amount of motion by calculating a difference between the two positions of device 302 at poses 306*a* and 306*b*. If device 302 comprises an inertial sensor, input module 102 may receive orientation information of device 302 at poses 306*a* and 306*b*. Thus, analysis module 104 may compute the amount of overlap by determining the field-of-view of camera 302 at each orientation of poses 306*a* and 306*b*, and calculating any overlap between the two field-of-views.

If the 3D reconstruction indicator comprises the number of multiview tracks of the current video image data, analysis module 104 may compute this number of multiview tracks. According to certain aspects, a multiview track may be an image feature that is visible in at least three images and can be reconstructed in 3D. For example, point 408 may be considered a multiview track since it is visible in the images represented by viewpoints 400*a*, 400*b*, and 400*c*. Analysis module 104 may identify one or more multiview tracks of the current video image data. The more multiview tracks that are added or extended by the current video image data, the more useful the current video image data may be for 3D reconstruction together with the previous image.

According to step S208, analysis module 104 determines whether the 3D reconstruction indicator (e.g., as determined in step S206) is sufficient to allow a 3D reconstruction of building 304 based on the current video image data and the previous image. For example, analysis module 104 determines whether the amount of motion, the amount of overlap, the 3D information ratio, and/or the number of multiview tracks of the current video image data are sufficient to allow a 3D reconstruction of building 304 using the previous image and the current video image data (e.g., if captured as an image).

If the 3D reconstruction indicator comprises the amount of overlap, analysis module 104 may determine whether the amount of overlap is sufficient by comparing the amount of overlap to a maximum overlap threshold and a minimum overlap threshold. The maximum overlap threshold, for example, sets a maximum threshold of overlap that the current video image data should have with the previous image in order for the current video image data (e.g., if captured as an image) to be considered sufficient to generate the 3D reconstruction of building 304 together with the previous image. The maximum overlap threshold may be adjusted as necessary to prevent the user from capturing too many unnecessary and redundant images. For example, by setting the maximum overlap threshold lower, the user may be prevented from capturing too many unnecessary and redundant images. In some aspects, the maximum overlap threshold may be set at no higher than 99%. However, other suitable values for this threshold (higher or lower) may be used depending on the desired specific implementation of method 200.

According to certain aspects, the minimum overlap threshold sets a minimum threshold of overlap that the current video image data is allowed to have with the previous image before the current video image data (e.g., if captured as an image) is not considered to be sufficient to generate the 3D reconstruction of building 304 together with the previous image. In some aspects, the minimum overlap threshold may be set at no lower than 35%. However, other suitable values for this threshold (higher or lower) may be used depending on the desired specific implementation of method 200.

Analysis module 104 may determine whether the amount of overlap is sufficient by comparing the amount of overlap to the maximum overlap threshold and the minimum overlap threshold. For example, analysis module 104 may determine that the amount of overlap is sufficient if the amount of overlap is (i) less than or equal to the maximum overlap threshold and (ii) greater than or equal to a minimum overlap threshold.

If the 3D reconstruction indicator comprises the amount of motion, analysis module 104 may determine whether the amount of motion is sufficient by comparing the amount of motion to a minimum motion threshold. The minimum motion threshold, for example, sets a minimum threshold that device 302 should move from the previous pose in order for the current video image data (e.g., if captured as an image) to be considered sufficient to generate the 3D reconstruction of building 304 together with the previous image. The minimum motion threshold may be adjusted as necessary to prevent the user from capturing too many unnecessary and redundant images. For example, by setting the minimum motion threshold higher, the user may be prevented from capturing too many unnecessary and redundant images. In some aspects, the minimum motion threshold may be set to zero. However, other suitable values for this threshold may be used depending on the desired specific implementation of method 200. Analysis module 104, for example, may determine whether the amount of motion is sufficient by comparing the amount of motion to the minimum motion threshold. Analysis module 104 may determine that the amount of motion is sufficient if the amount of motion is greater than or equal to the minimum motion threshold.

If the 3D reconstruction indicator, in particular, comprises the 3D information ratio, analysis module 104 may determine whether the 3D information ratio is sufficient by comparing the 3D information ratio to a 3D information threshold. The 3D information threshold, for example, sets a minimum threshold that the 3D information ratio may be in order for the current video image data (e.g., if captured as an image) to be considered sufficient to generate the 3D reconstruction of building 304 together with the previous image. The 3D information threshold may be adjusted according to the desired fit of the 3D feature points to the intermediate 3D motion model. Different values for this threshold may be used depending on the desired specific implementation of method 200. Analysis module 104 may determine that the 3D information ratio is sufficient if the 3D information ratio is greater than or equal to the 3D information threshold.

If the 3D reconstruction indicator comprises the number of multiview tracks of the current video image data, analysis module 104 may determine whether the number of multiview tracks is sufficient by comparing the number of multiview tracks to a multiview track threshold. The multiview track threshold, for example, sets a minimum threshold that the number of multiview tracks may be in order for the current video image data (e.g., if captured as an image) to be considered sufficient to generate the 3D reconstruction of building 304 together with the previous image. The multiview track threshold may be adjusted according to the extent of features of the target desired to be reconstructed as a 3D model. Different values for this threshold may be used depending on the desired specific implementation of method 200. Analysis module 104 may determine that the number of multiview tracks is sufficient if the number of the multiview tracks is greater than or equal to the multiview track threshold.

According to step S210, guidance module 106 assists the user in capturing a current image of building 304 from the current video image data based on the determination of whether the 3D reconstruction indicator is sufficient (e.g., as determined in step S208). In particular, guidance module 106 assists the user in capturing the current image if the amount of motion, the amount of overlap, the 3D information ratio, and/or the number of multiview tracks of the current video image data are determined to be sufficient. For example, the image shown in viewpoint 400b may be captured (e.g., recorded) as the current image. The current image and the previous image are suitable for the 3D reconstruction of building 304.

In some aspects, guidance module 106 may display to the user an indication of when to capture the current image. For example, as shown in FIG. 4B, the instruction to "Snap!" appears at the bottom right hand corner of the screen of device 302, thereby letting the user know that it is time to capture the current image (e.g., activate a shutter button of device 302) when device 302 is at pose 306b. In some aspects, guidance module 106 may automatically capture the current image at the appropriate time without requiring the user to manually capture the current image.

According to certain aspects, guidance module 106 may determine a pose that device 302 should engage in to capture an image that can be used for 3D reconstruction of building 302 together with the previous image. For example, suppose that device 302 is engaged in an intermediate pose 306d (e.g., as shown in FIG. 3) between pose 306a and pose 306b.

While device 302 is engaged in pose 306d, input module 102 may receive intermediate video image data. Furthermore, suppose that device 302, when engaged in intermediate pose 306d, has not moved a sufficient amount from previous pose 306a to satisfy the minimum motion threshold. Therefore, an image cannot be captured from the intermediate video image data to generate the 3D reconstruction of building 304 together with the previous image. In such a situation, guidance module 106 can determine the pose that device 302 should engage in to allow the user to capture an image (e.g., the current image as illustrated by viewpoint 400b) that can be used for 3D reconstruction of building 304 together with the previous image. In this example, guidance module 106 may determine that current pose 306b is the pose that device 302 should engage in to capture such an image. Therefore, guidance module 106 may display to the user an indication of where to capture such an image (e.g., when the intermediate video image data is displayed to the user). This indication, for example, may comprise at least one of a map (e.g., similar in layout to the top view layout shown in FIG. 3), a grid, a direction, a route, an arrow, and any other feature to guide the user to the desired location. For example, as shown in FIG. 4A, arrow 404 is used to direct the user towards the right in order to arrive at a position that would allow an image to be captured for 3D reconstruction together with the previous image.

According to certain aspects, guidance module 106 may maintain a graph of poses that device 302 engaged in to capture images of the target. FIG. 3 illustrates an example of such a graph. According to certain aspects, two poses may be connected to one another in the graph if the images associated with these poses overlap with one another. In some aspects, two poses may be connected to one another if the images associated with these poses are sufficient to be used together to generate a 3D reconstruction of the target. In the present illustration, guidance module 106 may add the current pose (e.g., pose 306b) to the graph if the 3D reconstruction indicator is determined to be sufficient. As shown in FIG. 3, the current pose is connected to previous poses 306a and 306d.

Once the user has captured the current image, for example at pose 306b, the user may be directed to continue moving around building 304 to capture images of building 304 from additional viewpoints for 3D reconstruction of building 304. Method 200 may be repeated to capture the additional images. For example, the image captured at pose 306b (e.g., illustrated from viewpoint 400b) may become the next previous image, and method 200 may be implemented to guide the user from pose 306b to pose 306c to capture an additional image for the 3D reconstruction (e.g., illustrated from viewpoint 400c). Method 200 may be repeated until the user has covered all the faces of building 304 that are desired to be reconstructed as a 3D model. Although FIG. 3 shows that the orientation of device 302 is generally perpendicular to a face of building 304, method 200 may be implemented even when device 302 is oriented at other angles relative to the faces of building 304.

Illustrating the poses using the connections as shown in FIG. 3 may be useful because it provides an overview of which poses are associated with images that are sufficient to be used together to generate at least a partial 3D model of the target. If all the poses are connected to one another directly or indirectly (e.g., as shown in FIG. 3), then the images associated with these poses may be used together to generate a single 3D model of the target. On the other hand, if not all of the poses are connected to one another directly or indirectly, then the poses may break up into different clusters, with each cluster having poses that are associated with images that yield a separate partial 3D model of the target.

Figure 5:
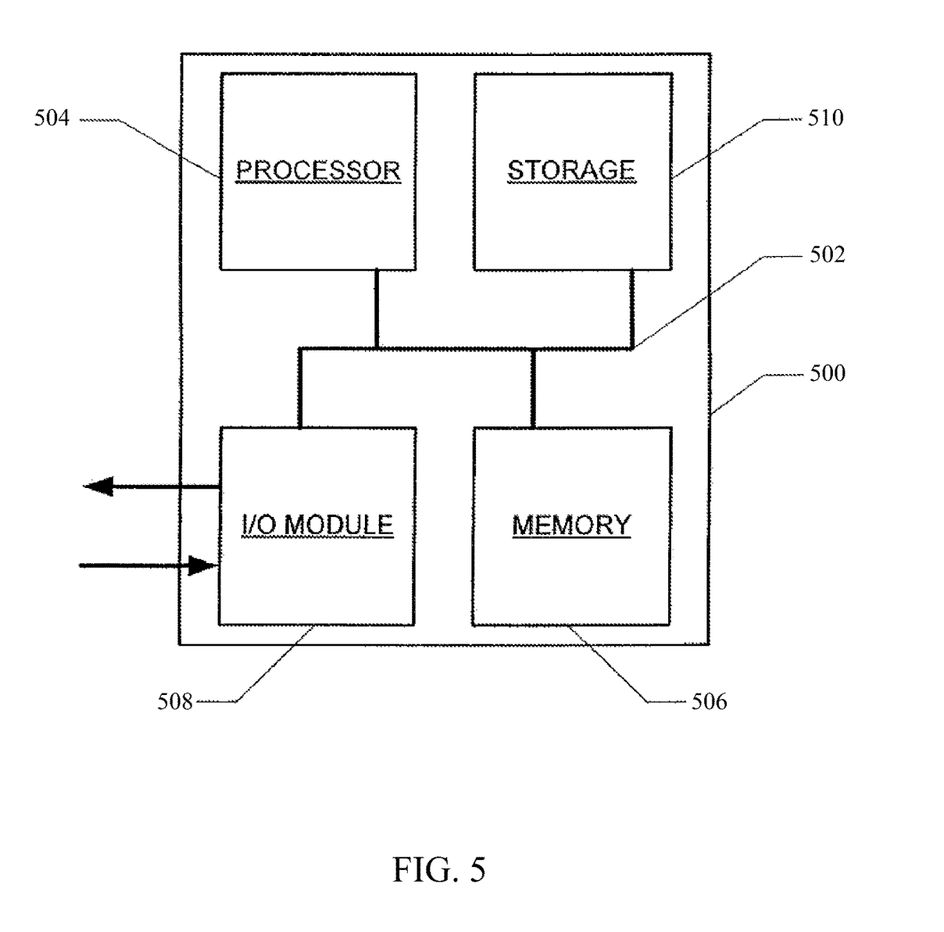
FIG. 5 is a block diagram illustrating components of a controller, in accordance with various aspects of the subject technology.

FIG. 5 is a block diagram illustrating components of controller 500, in accordance with various aspects of the subject technology. Controller 500 comprises processor module 504, storage module 510, input/output (I/O) module 508, memory module 506, and bus 502. Bus 502 may be any suitable communication mechanism for communicating information. Processor module 504, storage module 510, I/O module 508, and memory module 506 are coupled with bus 502 for communicating information between any of the modules of controller 500 and/or information between any module of controller 500 and a device external to controller 500. For example, information communicated between any of the modules of controller 500 may include instructions and/or data. In some aspects, bus 502 may be a universal serial bus. In some aspects, bus 502 may provide Ethernet connectivity.

In some aspects, processor module 504 may comprise one or more processors, where each processor may perform different functions or execute different instructions and/or processes. For example, one or more processors may execute instructions for assisting a user in capturing images for 3D reconstruction, and one or more processors may execute instructions for input/output functions.

Memory module 506 may be random access memory ("RAM") or other dynamic storage devices for storing information and instructions to be executed by processor module 504. Memory module 506 may also be used for storing temporary variables or other intermediate information during execution of instructions by processor 504. In some aspects, memory module 506 may comprise battery-powered static RAM, which stores information without requiring power to maintain the stored information. Storage module 510 may be a magnetic disk or optical disk and may also store information and instructions. In some aspects, storage module 510 may comprise hard disk storage or electronic memory storage (e.g., flash memory). In some aspects, memory module 506 and storage module 510 are both a machine-readable medium.

Controller 500 is coupled via I/O module 508 to a user interface for providing information to and receiving information from an operator of system 100. For example, the user interface may be a mobile display screen, an LED screen, a cathode ray tube ("CRT"), or LCD monitor for displaying information to an operator. The user interface may also include, for example, a touch screen, a keyboard, or a mouse coupled to controller 500 via I/O module 508 for communicating information and command selections to processor module 504.

According to various aspects of the subject technology, methods described herein are executed by controller 500. Specifically, processor module 504 executes one or more sequences of instructions contained in memory module 506 and/or storage module 510. In one example, instructions may be read into memory module 506 from another machine-readable medium, such as storage module 510. In another example, instructions may be read directly into memory module 506 from I/O module 508, for example from an operator of system 100 via the user interface. Execution of the sequences of instructions contained in memory module 506 and/or storage module 510 causes processor module 504 to perform methods to assist a user in capturing images for 3D reconstruction. For example, a computational algorithm for assisting a user in capturing images for 3D reconstruction may be stored in memory module 506 and/or storage module 510 as one or more sequences of instructions. Information such as the video image data, the poses of the device, the images captured by the device, the 3D reconstruction indicator, the 3D feature points, the 2D feature points, the 3D information threshold, the multiview tracks, the multiview track threshold, the graph of the poses of the device, the minimum motion threshold, the minimum overlap threshold, the indication of when to capture an image, the indication of where to capture an image, and/or other information may be communicated from processor module 504 to memory module 506 and/or storage module 510 via bus 502 for storage. In some aspects, the information may be communicated from processor module 504, memory module 506, and/or storage module 510 to I/O module 508 via bus 502. The information may then be communicated from I/O module 508 to an operator of system 100 via the user interface.

One or more processors in a multi-processing arrangement may also be employed to execute the sequences of instructions contained in memory module 506 and/or storage module 510. In some aspects, hard-wired circuitry may be used in place of or in combination with software instructions to implement various aspects of the subject technology. Thus, aspects of the subject technology are not limited to any specific combination of hardware circuitry and software.

The term "machine-readable medium," or "computer-readable medium," as used herein, refers to any medium that participates in providing instructions to processor module 504 for execution. Such a medium may take many forms, including, but not limited to, non-volatile media and volatile media. Non-volatile media include, for example, optical or magnetic disks, such as storage module 510. Volatile media include dynamic memory, such as memory module 506. Common forms of machine-readable media or computer-readable media include, for example, floppy disk, a flexible disk, hard disk, magnetic tape, any other magnetic medium, a CD-ROM, DVD, any other optical medium, punch cards, paper tape, any other physical mediums with patterns of holes, a RAM, a PROM, an EPROM, a FLASH EPROM, any other memory chip or cartridge, or any other medium from which a processor can read.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology.

What is claimed is:

1. A system for assisting a user in capturing images for generation of a three-dimensional (3D) model of a target, the system comprising:
   one or more processors; and
   memory storing instructions executable by the processor;
   wherein the instructions comprise:
   receiving current video image data from a device, the current video image data being associated with a current pose of the device;
   identifying 3D feature points of the current video image data and of at least one previous image, to generate at least a partial intermediate 3D motion model based on the 3D feature points, to identify two-dimensional (2D) feature points of the current video image data and of the at least one previous image, and to generate at least a partial 2D motion model based on the 2D feature points, the at least one previous image being associated with a previous pose of the device;
   determining a 3D information ratio based on a number of the 3D feature points and a number of the 2D feature points;
   assisting the user with capturing an additional image of the target based on whether the 3D information ratio is greater than or equal to a threshold; and
   generating a 3D model of the target based on video image data from the device.

2. The system of claim 1, wherein the instructions further comprise receiving at least one of (i) a current position of the device from a global positioning sensor and (ii) a current orientation of the device from an inertial sensor.

3. The system of claim 2, wherein the instructions further comprise comparing the current position of the device to a previous position of the device, and comparing the current orientation of the device to a previous orientation of the device, wherein assisting the user with capturing an additional image of the target is further based on the comparisons.

4. The system of claim 1, wherein the instructions further comprise determining the amount of overlap between the current video image data and the at least one previous image based on at least one of (i) an amount of translation of the current video image data relative to the at least one previous image and (ii) an amount of rotation of the current video image data relative to the at least one previous image, and wherein assisting the user with capturing an additional image of the target is further based on the amount of overlap.

5. The system of claim 1, wherein the instructions further comprise determining whether an amount of motion of the device is greater than or equal to a minimum motion threshold, and wherein assisting the user with capturing an additional image of the target is further based on whether the amount of motion of the device is greater than or equal to the minimum motion threshold.

6. The system of claim 1, wherein the instructions further comprise determining an amount of overlap between the current video image data and the at least one previous image, comparing the amount of overlap to a maximum overlap threshold, and wherein assisting the user with capturing an additional image of the target is further based on determining whether the amount of overlap is less than or equal to the maximum overlap threshold.

7. The system of claim 1, wherein the instructions further comprise identifying one or more multiview tracks of the current video image data, each of the one or more multiview tracks comprising an image feature visible in the current video image data and at least two previous images of the target, and wherein assisting the user with capturing an additional image of the target is further based on the number of the one or more multiview tracks.

8. The system of claim 7, wherein the instructions further comprise comparing the number of the one or more multiview tracks to a multiview track threshold, and wherein assisting the user with capturing an additional image of the target is further based on comprises determining whether the number of the one or more multiview tracks is greater than or equal to the multiview track threshold.

9. The system of claim 1, wherein the instructions further comprise maintaining a graph of the at least one previous pose.

10. The system of claim 9, wherein two of the at least one previous poses are connected to one another in the graph if the previous image of one of the two previous poses overlaps with the previous image of the other of the two previous poses.

11. The system of claim 9, wherein the instructions further comprise adding the current pose to the graph, the current pose being connected to the at least one previous pose in the graph.

12. The system of claim 1, wherein assisting the user with capturing an additional image further comprises determining the pose of the device for capturing the additional image based on the at least one previous image and the at least one previous pose.

13. The system of claim 1, wherein assisting the user with capturing an additional image further comprises displaying to the user an indication of where to capture the current image, the indication of where to capture the current image comprising at least one of a map, a grid, a direction, a route, and an arrow.

14. A method for assisting a user in capturing images for generation of a three-dimensional (3D) model of a target, the method comprising:
receiving, with one or more processors, current video image data from a device, the current video image data being associated with a current pose of the device;
identifying, with one or more processors, 3D feature points of the current video image data and of at least one previous image, to generate at least a partial intermediate 3D motion model based on the 3D feature points, to identify two-dimensional (2D) feature points of the current video image data and of the at least one previous image, and to generate at least a partial 2D motion model based on the 2D feature points, the at least one previous image being associated with a previous pose of the device;
determining, with one or more processors, a 3D information ratio based on a number of the 3D feature points and a number of the 2D feature points;
assisting, with one or more processors, the user with capturing an additional image of the target based on whether the 3D information ratio is greater than or equal to a threshold; and
generating, with one or more processors, a 3D model of the target based on video image data from the device.

15. The method of claim 14, further comprising determining an amount of overlap between the current video image data and the at least one previous image of the target, and wherein assisting the user with capturing an additional image of the target is further based on a comparison of the amount of overlap with an overlap threshold.

16. A machine-readable non-transitory medium encoded with executable instructions for assisting a user in capturing images for generation of a three-dimensional (3D) model, the instructions comprising code for:
receiving current video image data from a device, the current video image data being associated with a current pose of the device;
identifying 3D feature points of the current video image data and of at least one previous image, to generate at least a partial intermediate 3D motion model based on the 3D feature points, to identify two-dimensional (2D) feature points of the current video image data and of the at least one previous image, and to generate at least a partial 2D motion model based on the 2D feature points, the at least one previous image being associated with a previous pose of the device;
determining a 3D information ratio based on a number of the 3D feature points and a number of the 2D feature points;
assisting the user with capturing an additional image of the target based on whether the 3D information ratio is greater than or equal to a threshold; and
generating a 3D model of the target based on video image data from the device.

17. The machine-readable medium of claim 16, wherein assisting the user comprises displaying to the user an indication of when and/or where to capture the current image.

* * * * *